United States Patent [19]

Mihara et al.

[11] Patent Number: 4,998,027
[45] Date of Patent: Mar. 5, 1991

[54] ARBITER CIRCUIT

[75] Inventors: Masaaki Mihara; Toshifumi Kobayashi, both of Hyogo, Japan

[73] Assignee: Mitsubishi Denki Kabushiki Kaishi, Tokyo, Japan

[21] Appl. No.: 491,014

[22] Filed: Mar. 9, 1990

[30] Foreign Application Priority Data

Mar. 13, 1989 [JP] Japan ................................ 1-60204

[51] Int. Cl.[5] ...................... H03K 19/20; H03K 5/153
[52] U.S. Cl. .................................. 307/445; 307/473; 307/480; 307/362; 307/272.2; 328/110; 364/242.7
[58] Field of Search ............... 307/443, 445, 473, 480, 307/362, 272.2-272.3, 546, 553; 328/110; 364/241.2-241.6, 242.7

[56] References Cited

U.S. PATENT DOCUMENTS 4,484,273 11/1984 Stiffler et al. .................... 364/200
4,841,168 4/1989 Kubota ........................... 307/272.2
4,902,909 2/1990 Chartepie ...................... 307/272.2

OTHER PUBLICATIONS

"ISSCC85 Digest of Technical Papers", p. 45, Feb. 13, 1985, by Frank E. Barber, Daniel J. Eisenberg, Gloria A. Ingram, Mark S. Strauss, and Thomas R. Wik.

Primary Examiner—Stanely D. Miller
Assistant Examiner—M. R. Wambach
Attorney, Agent, or Firm—Lowe, Price, Leblanc, Becker & Shur

[57] ABSTRACT

Disclosed is an arbiter circuit for arbitrating a contention between two request signals which simultaneously attain the H (logical high) level indicating a "request". In this arbiter circuit, buffer circuits, having different input logic threshold voltages, are connected to the respective outputs of two three-input NAND gates. The respective outputs of these two buffer circuits, as signals indicating "acknowledgement" or "negative acknowledgement" of the request signals, are derived as final outputs of the arbiter circuit. One of the buffer circuits has an input logic threshold voltage lower than a logic threshold voltage of the two NAND gates, while the other buffer circuit has an input logic threshold voltage set higher than the logic threshold voltage of the NAND gates. Therefore, when the NAND gates output a voltage with the logic level neither the H level nor the L (logical low) level, a signal of the logic level H indicating the "negative acknowledgement" and a signal of the logical level L indicating the "acknowledgement" are reliably outputted from the buffer circuit with the lower input logic threshold voltage and from the other buffer circuit with the higher input logic threshold voltage, respectively. That is, even if two requests occur simultaneously, one of the request signals is rapidly acknowledged.

7 Claims, 6 Drawing Sheets

NODE A $\overline{ACK}$-A
(T3)

NODE B $\overline{ACK}$-B
(T4)

FIG.4
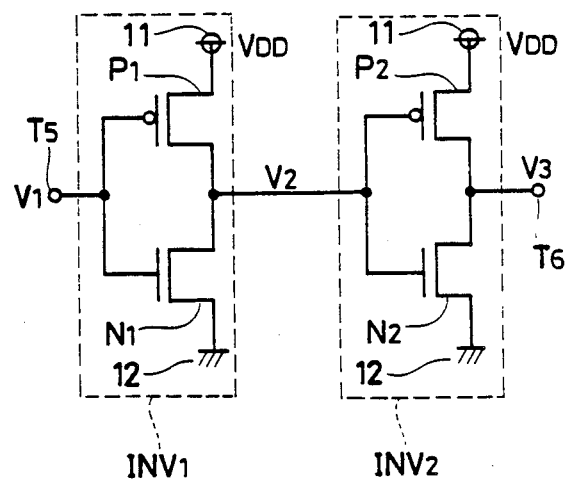
FIG.5A
FIG.5B
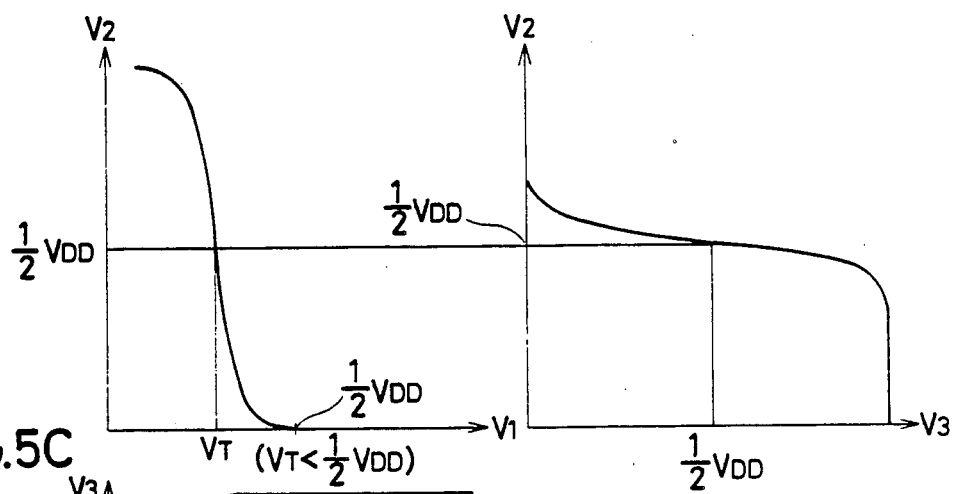
FIG.5C
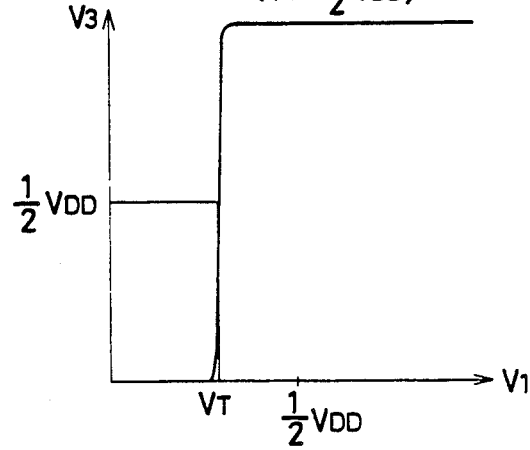

REQ-A

REQ-B $\overline{\text{ACK-A}}$ $\overline{\text{ACK-B}}$ t0  t1  t2  t3

ARBITER CIRCUIT

BACKGROUND OF THE INVENTION

1. Field of the Invention

The present invention relates generally to arbiter circuits and, more particularly, to an arbiter circuit in which a metastable state is removed.

2. Description of the Background Art

In case that a plurality of digital subsystems (e.g., a multiprocessor system) which operate asynchronously to one another, share one resource (e.g., a disk unit), since requests-to-use a shared resource from the subsystems occur at random in time, a contention of these requests need be arbitrated. For example, when the request to use the shared resource is given from one of the subsystems while the shared resource is already in use by another subsystem, it is required to queue the request until the use of the shared resource is completed. An arbiter circuit carries out such contention arbitrating processing. The arbiter circuit is employed also to a DRAM (Dynamic Random Access Memory), one of semiconductor memory devices.

FIG. 6 is a schematic block diagram of one example of the configuration of a DRAM chip. Referring to this figure, the DRAM chip 13 comprises thereon a memory portion 14 having a plurality of storage elements and storing information, a memory control portion 15 for writing into and reading out from the memory portion 14 the information, a refresh control portion 16 for holding information stored in the memory portion 14, and an arbiter circuit 17 for preventing simultaneous operations of writing into and reading from the memory portion 14 by the memory control portion 15 and of holding the stored information of the memory portion 14 by the refresh control portion 16. The memory control portion 15 designates an address of a storage element to be accessed to the memory portion 14 in accordance with an access request externally supplied to the memory portion 14. Accordingly, the stored information of the designated storage element is read out from the memory portion 14 to be externally outputted, or alternatively, data externally supplied is stored in the designated storage element.

Meanwhile, each storage element of the memory portion 14 comprises a MOSFET (MOS Field Effect Transistor), and a charge stored in a gate thereof in accordance with the stored information is discharged from the gate and drain as time passes. That is, the stored information of the memory portion 14 of the DRAM disappears as the time passes. Thus, in order to avoid the disappearance of the stored information, the stored information is regularly rewritten in all the storage elements included in the memory portion 14. The refresh control portion 16 is a circuit to accomplish this rewriting. The refresh control portion 16 carries out the rewriting of the stored information regularly and automatically for the memory portion 14. As described above, the external access operation and the refresh operation from the refresh control portion 16 for the memory portion 14 are carried out in the DRAM. However, if these two operations are simultaneously carried out for the memory portion 14, these operations are not carried out correctly. For example, if the access operation is carried out in accordance with an external request while the refresh operation is being carried out for the memory portion 14, neither correct reading nor writing is carried out. Therefore, the access operation should not be carried out before completion of the refresh operation in such a case. Conversely, as a matter of course, the refresh operation should not be carried out before completion of the access operation in case that the access operation is previously carried out. That is, only the alternative of the access operation or the refresh operation need be acknowledged. The arbiter circuit 17 arbitrates such a contention between the request for the access operation and the one for refresh operation. When a access request is externally given to the memory portion 14, the memory control portion 15 first outputs an access request signal REQA to the arbiter circuit 17. Similarly, when the refresh operation should be carried out for the memory portion 14, the refresh control portion 16 first outputs a refresh request signal REQB to the arbiter circuit 17. The arbiter circuit 17 outputs an acknowledge signal which acknowledges only one of these request signals and a signal which does not acknowledge the other request signal to arbitrate the contention of these request signals. As a result, the control portion (the memory control portion 15 or the refresh control portion 16) supplied with the acknowledge signal carries out a predetermined operation for the memory portion 14. That is, when the acknowledge signal ACKA attains a voltage level indicating the acknowledgement, the external access operation is carried out for the memory portion 14. Meanwhile, when the other acknowledge signal ACKB attains a voltage level indicating the acknowledgement, the stored information is rewritten for the memory portion 14.

FIG. 7 is a logic circuit diagram of a conventional arbiter circuit shown in "ISSCC85 DIGEST OF TECHNICAL PAPERS (P.45)". Referring to this figure, this arbiter circuit comprises two-input NAND gates 1a and 1b. The arbiter circuit further comprises a request signal input terminal T1 to which a request signal REQ-A is inputted, a request signal input terminal T2 to which a request signal REQ-B is inputted, an acknowledge signal output terminal T3 from which an acknowledge signal $\overline{ACK-A}$ is derived in response to the request signal REQ-A, and an acknowledge signal output terminal T4 from which an acknowledge signal $\overline{ACK-B}$ is derived in response to the request signal REQ-B. The NAND gate 1a has one input terminal 1 connected to the input terminal T1 and the other input terminal 2 connected to an output terminal of the NAND gate 1b. Further, the NAND gate 1b has one input terminal 4 connected to the input terminal T2 and the other input terminal 3 connected to an output terminal of the NAND gate 1a. The respective output terminals of the NAND gates 1a and 1b are connected to the respective output terminals T3 and T4. A description on the NAND gates will be given prior to a description on the operation of this arbiter circuit. In general, a NAND gate of n-input one-output ($n \geq 2$) carries out an inverter operation for the lowest input voltage out of n input voltages. That is, the NAND gate is constituted by a series connection of an AND gate and an inverter circuit.

FIG. 8 shows a transmission characteristic of a general NAND gate. The abscissa in this figure indicates an input voltage $V_{IN}$, and the ordinate indicates an output voltage $V_{OUT}$. Referring to this figure, if the lowest input voltage out of the n input voltages of the NAND gate is lower than an input voltage by which an output voltage level of the inverter circuit (H or L (logical high or logical low)) is switched, i.e., an input logic threshold voltage, a voltage of the H level is outputted by the inverter circuit. Conversely, if a minimum value of the n voltages to be inputted to the NAND gate is higher than the input logic threshold voltage, a voltage of L level is outputted by the inverter circuit. Further, when a minimum value of the n input voltages is equal to the input logic threshold voltage of the inverter circuit, the inverter circuit determines an intermediate value which is neither the L level nor the H level, and an output voltage of the NAND gate attains the intermediate value which is neither the L level nor the H level (this value is generally about half a value of a supply voltage of the inverter). Therefore, a boundary value of the output voltage levels H and L of the NAND gate is equal to that of the input voltage level of the inverter circuit constituting the NAND gate. This boundary value is called a logic threshold voltage $V_{th}$ of the NAND gate.

The operation of this arbiter circuit will then be described. Reference is also made to the FIG. 9 for the description. FIGS. 9A–D are time charts of the request signals REQ-A and REQ-B and the corresponding acknowledge signals $\overline{ACK\text{-}A}$ and $\overline{ACK\text{-}B}$. The NAND gates 1a and 1b have the same logic threshold voltage. First, when the voltage levels of the request signals REQ-A and REQ-B are in the L level, lower than the input logic threshold voltage of the NAND gates 1a and 1b (an input voltage value corresponding to the boundary value of the output voltage level), each of the NAND gates 1a and 1b receives a voltage of the L level at its one input. Thus, the respective output voltages of the NAND gates 1a and 1b, i.e., the voltage levels of the output terminals T3 and T4 attain the H level representing negative acknowledgement. That is, neither the request signal REQ-A nor REQ-B is acknowledged in this case.

Then, when only the voltage of the request signal REQ-A attains the H level, higher than the input logic threshold voltage of the NAND gate 1a (in the time period $t_0$–$t_1$ in FIGS. 9A–D), a logic level H is supplied to both input terminals 1 and 2 of the NAND gate 1a. Thus, a voltage of the L level representing acknowledgement is supplied as the acknowledge signal $\overline{ACK\text{-}A}$ to an output terminal of the NAND gate 1a, that is, the output terminal T3. Meanwhile, since a logic level L is supplied to the input terminal 4 of the NAND gate 1b, the output voltage level thereof remains in the H level. That is, only the request signal REQ-A is acknowledged in this case. Next, when the voltage of the request signal REQ-B becomes higher than the input logic threshold voltage of the NAND gate 1b to attain the H level (in the time period $t_1$–$t_2$ in FIGS. 9A–D), a voltage of the H level of the request signal REQ-B is supplied to the input terminal 4 of the NAND gate 1b, while a voltage of the L level of an output of the NAND gate 1a is supplied to the other input terminal 3. Therefore, the output of the NAND gate 1b, i.e., the voltage of the acknowledge signal $\overline{ACK\text{-}B}$ attains the H level. Namely, even if the voltage of the request signal REQ-B attains the H level so as to indicate a request when the voltage of the request signal REQ-A previously attains the H level and thus its request is acknowledged, the request signal REQ-B is not acknowledged. In order to acknowledge the request signal REQ-B, the voltage level of a signal to be applied to the input terminal 3 of the NAND gate 1b, i.e., the acknowledge signal $\overline{ACK\text{-}A}$ should also attain the H level. Accordingly, the voltage level of the request signal $\overline{ACK\text{-}A}$, which is an input signal of the NAND gate 1a, may be the L level. That is, if the request of the request signal REQ-A is completed, the request of the request signal REQ-B is acknowledged. Further, a circuit operation in case that the voltage level of the request signal REQ-A attains the H level so as to indicate a request when the voltage level of the request signal REQ-B previously attains the H level and thus its request is acknowledged, is opposite to the one described in the above case. As has been described, even though the two request signals attain the level indicating a request, the latter request signal is not acknowledged but queued until a request of the previous request signal is completed. That is, an arbitration is carried out for the contention between the two request signals.

The conventional arbiter circuit is configured as described above and thus has the following disadvantages. The following description will also be referred to FIGS. 7 and 9A–D.

When the respective voltage levels of the request signals REQ-A and REQ-B are higher than the input logic threshold voltage of the NAND gates 1a and 1b to attain the H level at the same time (the time $t_3$ in FIGS. 9A–D), the logic level H is supplied to both input terminals of each of the NAND gates 1a and 1b. Thus, voltages at the respective output terminals of the NAND gates 1a and 1b fall lower than the logic threshold voltage of the NAND gates 1a and 1b, i.e., down to a range of the L level. Meanwhile, the NAND gate 1a receives an output of the NAND gate 1b as its input, and the NAND gate 1b receives an output of the NAND gate 1a as its input. Accordingly, the falling of the respective output voltages of the NAND gates 1a and 1b to the range of the L level means that a voltage at the one input terminal 2 of the NAND gate 1a falls to the range of the L level, and a voltage at the one input terminal 3 of the NAND gate 1b also falls to the range of the L level. If at least one of the inputs of the one NAND gate is in the L level, the output thereof tends to be the H level due to the characteristic of the NAND gate. Therefore, when the respective output voltages of the NAND gates 1a and 1b tend to fall to the L level at the same time, the output voltages are fedback to the alternate inputs of the NAND gates and thus oppositely tend to rise to the H level. Accordingly, the respective output voltages of the NAND gates 1a and 1b attain the intermediate value between the L level and the H level (at the time $t_3$ in FIGS. 9A–D). These output voltages are fedback to the inputs of the NAND gates 1a and 1b. As described above, when the lower input voltage of the one two-input NAND gate attains a value neither the H level nor the L level, i.e., the logic threshold voltage $V_{th}$, the NAND gate does not carry out the inverter operation for the lower input voltage. This state is called a metastable state. Consequently, no arbitration is carried out for the contention between the two request signals REQ-A and REQ-B.

However, it is difficult to practically manufacture the NAND gates 1a and 1b with the totally same characteristics, and thus an imbalance occurs on the characteristics of these NAND gates. That is, there is virtually a slight difference between the logic threshold voltage of the NAND gate 1a and that of the other gate 1b. Thus, the above described metastable state does not last forever, and the output voltage level of one of the NAND gates 1a and 1b (the H level or the L level) is determined some time by the logic threshold voltage of the other NAND gate to be determined. The determination of the output voltage level of one of the NAND gates causes the determination of the output voltage level of the other NAND gate which has the determined output voltage level as one of its inputs. That is, only one of the request signals REQ-A and REQ-B is acknowledged, so that the arbiter circuit is out of the metastable state. Therefore, conventionally, the imbalance between these two NAND gates, which occurs inevitably in the manufacture or is caused intentionally, renders the arbiter circuit out of the metastable state.

In the described passive method, however, the arbiter circuit inevitably has a period to be the metastable state. Therefore, a response of the acknowledge signals to the request signals delays by this period, resulting in a degradation in an access speed (in case of the DRAM) and the like. SUMMARY OF THE INVENTION It is an object of the present invention to provide an arbiter circuit capable of rapidly arbitrating a contention.

It is another object of the present invention to provide an arbiter circuit capable of arbitrating a contention without a reduction in access time.

It is a further object of the present invention to provide an arbiter circuit being out of a metastable state in arbitration of a contention.

It is a still further object of the present invention to provide an arbiter circuit capable of rapidly outputting an acknowledge signal to acknowledge only one request signal when a plurality of request signals simultaneously attain a level indicating a request.

In order to accomplish the above described objects, the arbiter circuit according to the present invention comprises first logic circuitry for receiving a first request signal, second logic circuitry for receiving a second request signal, first buffer circuitry coupled to an output signal from the first logic circuitry, and second buffer circuitry coupled to an output signal from the second logic circuitry. The first logic circuitry is further connected to receive the output signal from the second logic circuitry and an output signal from the second buffer circuitry. The second logic circuitry is further connected to receive the output signal from the first logic circuitry and an output signal from the first buffer circuitry. When receiving a first request signal earlier than when the second logic circuitry receives a second request signal, the first logic circuitry outputs a first signal of a first logic level indicating acknowledgement of the received first request signal. When receiving the second request signal earlier than when the first logic circuitry receives the first request signal, the second logic circuitry outputs a second signal of the first logic level indicating the acknowledgement of the received second request signal. Even if receiving the second request signal while the first signal from the first logic circuitry is being outputted, the second logic circuitry outputs a signal of a second logic level different from the first level indicating the acknowledgement of the second request signal. Even if receiving the first request signal while the second signal from the second logic circuitry is being outputted, the first logic circuitry outputs a signal of the second logic level different from the first level indicating the acknowledgement of the first request signal. The first and second logic circuitry respectively output signals of a third level which is intermediate between the first and second logic levels when receiving, respectively, the first and second request signals simultaneously. The first buffer circuitry provides the signal of the first level responsive to the signal of the third level, and the second buffer circuitry outputs the signal of the second level responsive to the signal of the third level.

Since the arbiter circuit according to the present invention is thus configured, when the first and second logic circuitry receive the first and second request signals simultaneously, the signals of the third level outputted from the first and second logic circuitry are converted into different signals of the first and second levels by the first and second buffer circuitry. That is, a signal indicating the acknowledgement is outputted from only the first buffer circuitry, and thus only the first request signal is acknowledged.

According to a preferred embodiment, an input logic threshold voltage of the first buffer circuitry is lower than that of the second buffer circuitry. Such a difference between the input logic threshold voltages of the first and second buffer circuitry indicates that even in the case that output voltages of the first and second logic circuitry to be supplied respectively to the first and second buffer circuitry are identical to each other, if the identical value of the output voltages is in the range of not less than the input logic threshold voltage of the first buffer circuitry nor more than that of the second buffer circuitry, signals outputted respectively from the first and second buffer circuitry have different logic levels.

According to a further preferred embodiment, the first logic circuitry comprises a first NAND gate, and the second logic circuitry comprises a second NAND gate. The input logic threshold voltage of the first buffer circuitry is lower than a logic threshold voltage of the first NAND gate, and the input logic threshold voltage of the second buffer circuitry is higher than a logic threshold voltage of the second NAND gate. In this case, the logic threshold voltages of the first and second NAND gates respectively constituting the first and second logic circuitry are in the described range of not less than the input logic threshold voltage of the first buffer circuitry nor more than that of the second buffer circuitry. Therefore, when the respective output voltages of the first and second NAND gates are equal to each other in the above described range, signals of the different logic levels are outputted from the first and second buffer circuitry. Here, a signal voltage corresponding to the third logic level is approximately equal to the logic threshold voltages of the first and second NAND gates. Therefore, even if the first and second request signals are equally applied respectively to the first and second NAND gates constituting the respective first and second logic circuitry, different logic levels are outputted from the first and second buffer circuitry. That is, if outputs of the first and second buffer circuitry are employed as final outputs of the arbiter circuit, an arbitration is immediately carried out for a contention between two requests occurring simultaneously.

In one aspect, the arbiter circuit according to the present invention comprises a first three-input NAND gate receiving a first request signal of a logic level of the H level, a second three-input NAND gate receiving a second request signal of a logic level of the H level, a first buffer circuit receiving an output of the fist NAND gate and having a first input logic threshold voltage, and a second buffer circuit receiving an output of the second NAND gate and having a second input logic threshold voltage higher than the first input logic threshold voltage. Here, the first NAND gate is further connected to receive the output of the second NAND gate and an output of the second buffer circuit, and the second NAND gate is further connected to receive the output of the first NAND gate and an output of the first buffer circuit. The first and second NAND gates both have a logic threshold voltage between the first and second input logic threshold voltages. When an output voltage of the first NAND gate is lower than the first input logic threshold voltage, the first buffer circuit outputs, as a signal indicating acknowledgement of the first request signal, a voltage of the L level. Meanwhile, when the output voltage of the first NAND gate is higher than the first input logic threshold voltage, the first buffer circuit outputs, as a signal indicating negative acknowledgement of the first request signal, a voltage of the H level. Similarly, when an output voltage of the second NAND gate is lower than the second input logic threshold voltage, the second buffer circuit outputs, as a signal indicating acknowledgement of the second request signal, a voltage of the L level. Meanwhile, when the output voltage of the second NAND gate is higher than the second input logic threshold voltage, the second buffer circuit outputs, as a signal indicating negative acknowledgment of the second request signal, a voltage of the H level. Further, the first and second NAND gates output voltages equal to the logic threshold voltages when simultaneously receiving the first and second request signals, respectively. According to the arbiter circuit configured as described above, when the first and second NAND gates respectively receive the first and second request signals simultaneously, the first buffer circuit inevitably outputs a signal indicating negative acknowledgement of the first request signal, and the second buffer circuit inevitably outputs a signal indicating acknowledgement of the second request signal. Subsequently, when a request of the second request signal is completed, a request signal of the H logic level is applied only to the first NAND gate, so that the first NAND gate outputs a voltage lower than the first input logic threshold voltage. Consequently, the first buffer circuit outputs a signal indicating acknowledgment of the first request signal, and the second buffer circuit outputs a signal indicating negative acknowledgement of the second request signal. That is, these two "requests" which occur simultaneously are acknowledged one by one in the predetermined order of priority.

As has been described, according to the arbiter circuit of the present invention, even if voltages of the two request signals simultaneously attain the logic level indicating the "request", the entire circuit becomes the metastable state, and thus no period occurs that an arbitration cannot be carried out for the contention between the two request signals. Therefore, acknowledge signals are outputted immediately in response to inputting of the request signals. As a result, despite timing of a change in level of the two request signals, it is possible to carry out more reliable and faster arbitration than in the conventional.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a circuit diagram of one example of the buffer circuits in FIG. 1;

FIGS. 5A to 5C are graphs showing a method of setting an input logic threshold value of the buffer circuit shown in FIG. 4;

DESCRIPTION OF THE PREFERRED EMBODIMENTS

Figure 1:
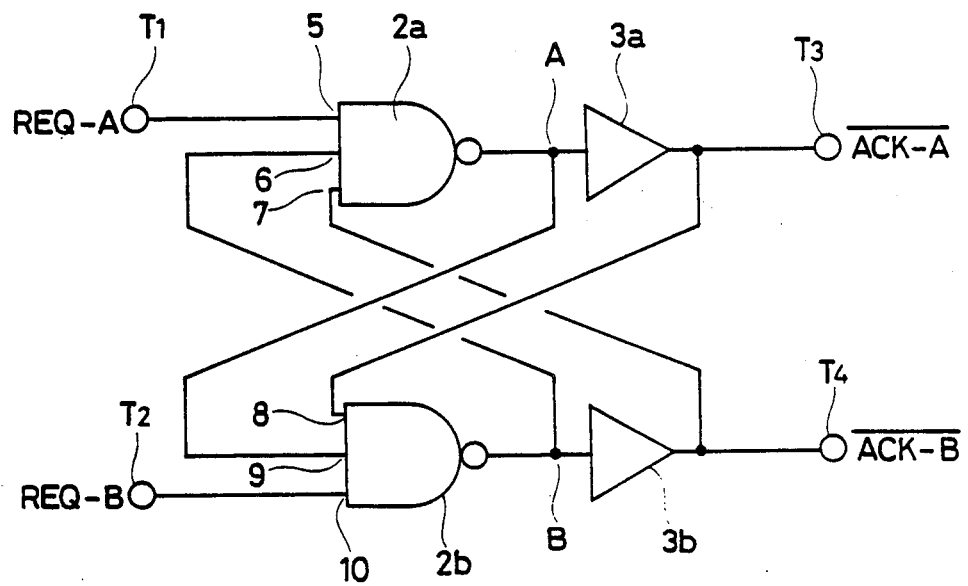
FIG. 1 is a logic circuit diagram of one embodiment of the present invention.

FIG. 1 is a logic circuit diagram of an arbiter circuit showing one embodiment of the present invention. Referring to this figure, this arbiter circuit comprises a three-input NAND gate 2a having input terminals 5, 6 and 7, a three-input NAND gate 2b having input terminals 8, 9 and 10, with the same characteristic as the NAND gate 2a, buffer circuits 3a and 3b, a request signal input terminal T1 to which a request signal REQ-A is inputted, a request signal input terminal T2 to which a request signal REQ-B is inputted, an acknowledge signal output terminal T3 from which an acknowledge signal $\overline{\text{ACK-A}}$ is derived in response to the request signal REQ-A, and an acknowledge signal output terminal T4 from which an acknowledge signal $\overline{\text{ACK-B}}$ is derived in response to the request signal REQ-B. The input terminals T1 and T2 are connected respectively to the input terminal 5 of the NAND gate 2a and the input terminal 10 of the NAND gate 2b. The buffer circuit 3a is provided between an output terminal of the NAND gate 2a and the terminal T3, and the buffer circuit 3b is provided between an output terminal of the NAND gate 2b and the terminal T4. Furthermore, the respective input terminals 6 and 9 of the NAND gates 2a and 2b are connected to the respective output terminals of the NAND gates 2b and 2a. The respective input terminals 7 and 8 of the NAND gates 2a and 2b are connected to the respective output terminals of the buffer circuits 3b and 3a. An input logic threshold voltage of the buffer circuit 3a is lower than a logic threshold voltage of the NAND gate 2a, and an input logic threshold voltage of the buffer circuit 3b is higher than a logic threshold voltage of the NAND gate 2b. Since the NAND gates 2a and 2b have the same characteristic, they have the same logic threshold voltage $V_{th}$.

Figure 2:
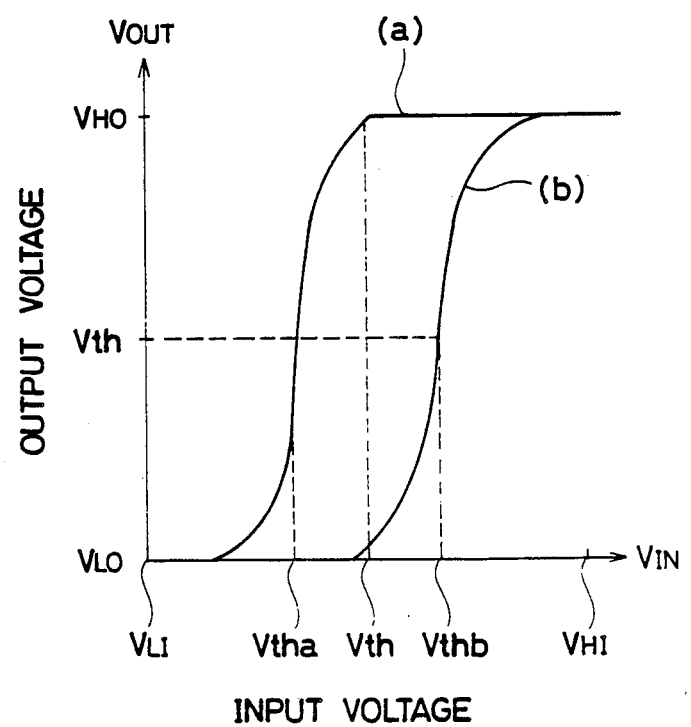
FIG. 2 is a graph showing transmission characteristics of buffer circuits in FIG. 1.
Figure 3A:
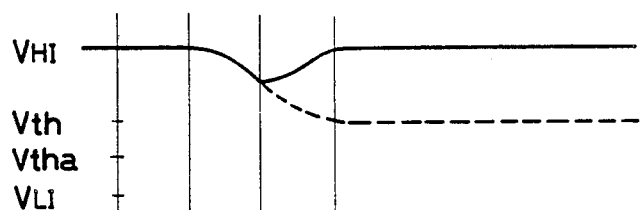
FIGS. 3A-D are waveform diagrams showing a circuit operation of FIG. 1.
Figure 3B:
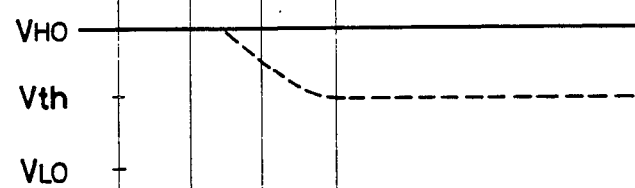
Figure 3C:
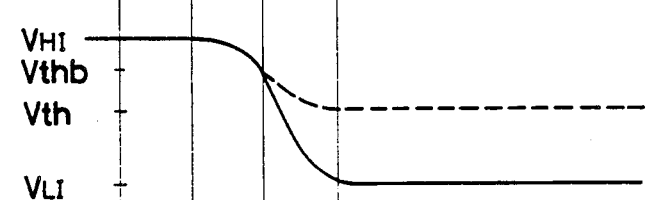
Figure 3D:
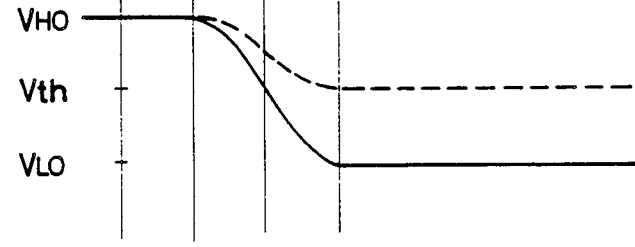
Figure 6:
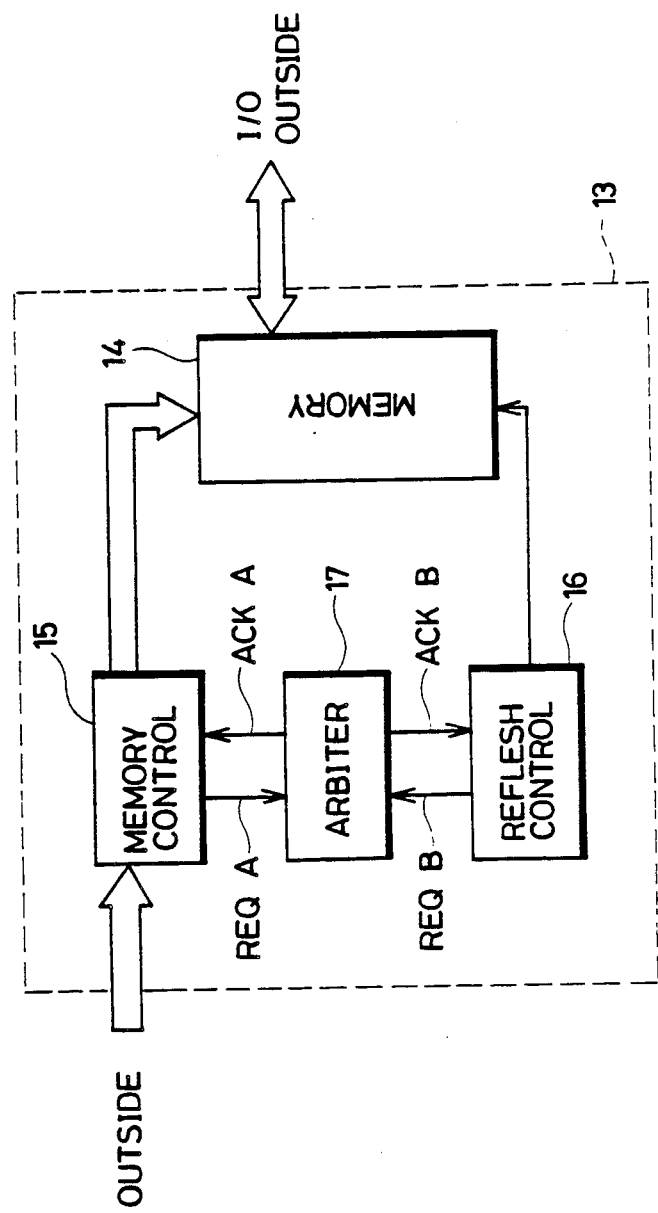
FIG. 6 is a schematic block diagram of a DRAM showing an example of usage of an arbiter circuit.
Figure 7:
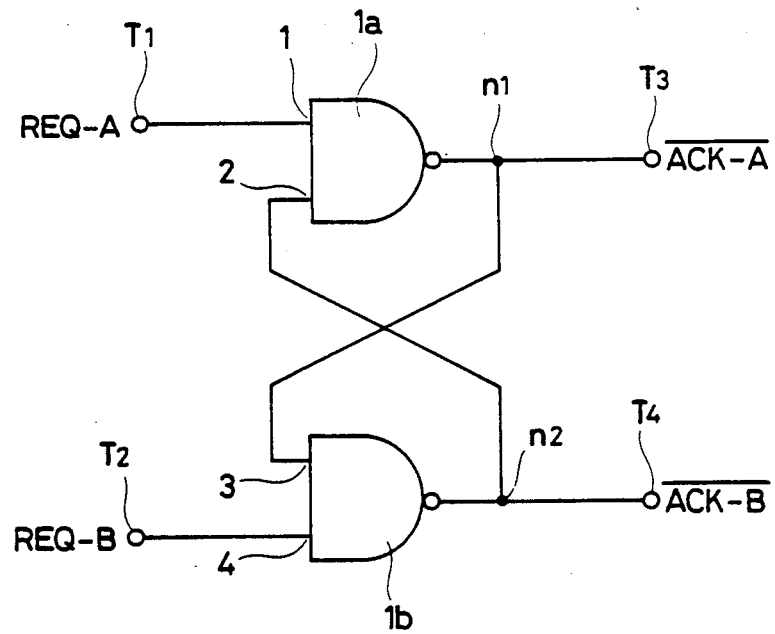
FIG. 7 is a logic circuit diagram of one example of a conventional arbiter circuit.
Figure 8:
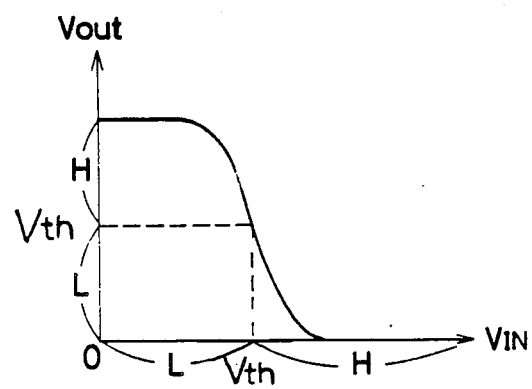
FIG. 8 is a graph showing transmission characteristics of NAND gates.
Figure 9A:
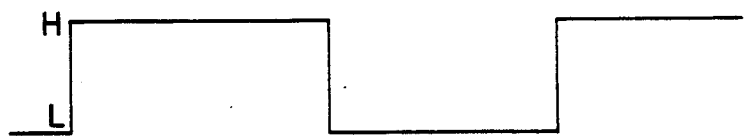
FIGS. 9A-D are time charts of request signals and acknowledge signals of the arbiter circuit shown in FIG. 7.
Figure 9B:
Figure 9C:
Figure 9D:
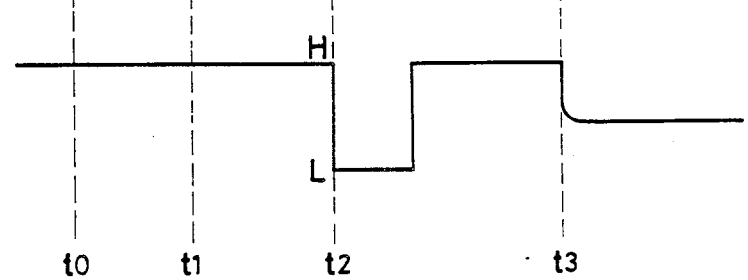

The operation of this arbiter circuit will now be described. Reference is also made to FIG. 2 for the description. FIG. 2 is a graph showing transmission characteristics of the buffer circuits 3a and 3b. In this figure, the curve (a) indicates the characteristic of the buffer circuit 3a, while the curve (b) indicates that of the buffer circuit 3b. Further, the abscissa indicates an input voltage $V_{IN}$; the ordinate indicates an output voltage $V_{OUT}$; the designations $V_{HO}$ and $V_{LO}$ indicate respectively a maximum value and a minimum value of the output voltages of the buffer circuits 3a and 3b; and the designations $V_{LI}$ and $V_{HI}$ indicate respectively a minimum value and a maximum value of the output voltages of the NAND gates 2a and 2b.

First, when voltages of the request signals REQ-A and REQ-B are both in the L level, lower than the input logic threshold voltages of the NAND gates 2a and 2b, each of the NAND gates 2a and 2b has one of its input terminals supplied with the L level. Accordingly, nodes A and B, which are the respective output terminals of the NAND gates 2a and 2b both have a voltage of the H level, higher than the logic threshold voltage $V_{th}$ of the NAND gates 2a and 2b. This voltage on the nodes A and B is higher than the input logic threshold voltage $V_{tha}$ of the buffer circuit 3a and the input logic threshold voltage $V_{thb}$ of the buffer circuit 3b. Therefore, the buffer circuits 3a and 3b supplied with this voltage both output a voltage of the H level. Thus, the output terminals T3 and T4 are supplied with the voltage of the H level indicating negative acknowledgement as the respective acknowledge signals $\overline{ACK-A}$ and $\overline{ACK-B}$. Accordingly, the input terminals 6 and 7 of the NAND gate 2a and the input terminals 8 and 9 of the NAND gate 2b are all supplied with a voltage of the H level. This supplied voltage is higher than the respective input logic threshold voltages $V_{tha}$ and $V_{thb}$ of the buffer circuits 3a and 3b and higher than the input logic threshold voltage of the NAND gates 2a and 2b.

Subsequently, when only the voltage of the request signal REQ-A becomes higher than the input logic threshold voltage of the NAND gate 2a to attain the "H" level indicating a "request", a voltage of the H level is applied to all the input terminals 5, 6 and 7 of the NAND gate 2a. Accordingly, a voltage on the node A being the output terminal of the NAND gate 2a falls to the L level, lower than the respective input logic threshold voltages $V_{tha}$ and $V_{thb}$ of the buffer circuits 3a and 3b, and lower than the input logic threshold voltage $V_{th}$ of the NAND gates 2a and 2b. Thus, the buffer circuit 3a outputs a voltage of the L level indicating acknowledgment as the acknowledge signal $\overline{ACK-A}$ to the output terminal T3. This outputted voltage is lower than the respective input logic threshold voltages $V_{tha}$ and $V_{thb}$ of the buffer circuits 3a and 3b and lower than the input logic threshold voltage of the NAND gates 2a and 2b. As a result, this voltage of the L level is inputted to both the input terminals 8 and 9 of the NAND gate 2b. This means that the NAND gate 2b always has an output voltage of the H level even if a voltage of any level is applied to the other input terminal 10 of the NAND gate 2b. Therefore, even if a potential level of the request signal REQ-B then becomes higher than the logic threshold voltage $V_{th}$ of the NAND gate 2b to be the H level, a voltage level of the acknowledge signal $\overline{ACK-B}$ attains the H level indicating negative acknowledgment. In order to acknowledge the request signal REQ-B, both the voltage of the acknowledge signal $\overline{ACK-A}$ to acknowledge the request signal REQ-A and the voltage on the node A should attain the H level. That is, the voltage level of the request signal REQ-A may attain the L level to complete the request. In case that the voltage level of the request signal REQ-B attains the H level indicating a request and thereafter that of the request signal REQ-A attains the H level indicating the request, a circuit operation in this case is opposite to the above described operation.

Next, a description will be given on a case that the request signals REQ-A and REQ-B simultaneously attain the H level indicating a request. FIGS. 3A–D are also referred to for the description. FIGS. 3A–D are waveform diagrams of the nodes A and B and the acknowledge signals $\overline{ACK-A}$ and $\overline{ACK-B}$. In this case, a voltage of the H level is applied to all the input terminals of the NAND gates 1a and 1b. Therefore, the respective outputs of the NAND gates 1a and 1b, i.e., the respective voltage levels on the nodes A and B fall to the L level lower than the logic threshold voltage $V_{th}$ of the NAND gates 1a and 1b (during the time period $t_4$–$t_5$ in FIGS. 3A–D). Here, the input logic threshold voltage $V_{thb}$ of the buffer circuit 3b is higher than the voltage $V_{tha}$ of the buffer circuit 3a and the input logic threshold voltage of the NAND gates 2a and 2b. Thus, in the case that the voltages on the nodes A and B fall simultaneously, a potential on the node B exceeds the input logic threshold voltage $V_{thb}$ of the buffer circuit 3b earlier than a potential on the node A exceeds the input logic threshold voltage $V_{tha}$ of the buffer circuit 3a (during the time period $t_5$–$t_6$ in FIG. 3) before the voltages on the nodes A and B fall to the logic threshold voltage $V_{th}$ of the NAND gates 2a and 2b. An output voltage level of the buffer circuit 3b thus attains the L level lower than the input logic threshold voltage of the NAND gates 2a and 2b. That is, the terminal T4 is supplied with a voltage of the L level indicating acknowledgement as the acknowledge signal $\overline{ACQ-B}$ to acknowledge the request signal REQ-B. This voltage is applied to the input terminal 7 of the NAND gate 2a. Meanwhile, a voltage of the H level is applied to the input terminal 5 of the NAND gate 2a, and a voltage at the input terminal 6 is about to fall to an intermediate voltage $V_{th}$ neither the H level nor the L level. Thus, the voltage at the input terminal 7 attains a minimum value of the three input voltages of the NAND gate 2a. That is, the NAND gate 2a carries out an inverting operation for the voltage at the input terminal 7. Therefore, an output potential of the NAND gate 2a, i.e., the potential on the node A rises to reach the H level irrespective of an input voltage level applied to the other input terminals 5 and 6. This H level voltage is higher than the input logic threshold voltage $V_{tha}$ of the buffer circuit 3a. Thus, the output terminal T3 is supplied with a voltage of the H level indicating negative acknowledgement as the acknowledge signal $\overline{ACK-A}$ to acknowledge the request signal REQ-A. That is, when the respective voltages of the request signals REQ-A and REQ-B attain the H level indicating a request, only the request signal REQ-B is immediately acknowledged, resulting in a reduction in the time period before the acknowledge signal $\overline{ACK-B}$ to acknowledge the request signal REQ-B is outputted, compared to the conventional. In the conventional arbiter circuit, when both voltages of the request signals REQ-A and REQ-B simultaneously attain the H level indicating a request, the circuit becomes metastable to cause both the acknowledge signals ACK-A and ACK-B (See the waveforms shown by the broken lines in FIGS. 3A–D) to have an intermediate voltage (the logic threshold voltage $V_{th}$ of the NAND gates) neither the H level nor the L level. In order to turn the above state to a state that the request signal REQ-A is acknowledged, the voltage on the node B and the output voltage of the buffer circuit 3b should attain the H level. That is, the voltage level of the request signal REQ-B may be the L level. Namely, when a request of the request signal REQ-B is completed, the request signal REQ-A is automatically acknowledged. As described, when the respective voltages of the request signals REQ-A and REQ-B simultaneously attain the H level indicating a request, the request signal REQ-B is first acknowledged and then the request signal REQ-A is. If a request of the request signal REQ-A is intended to have priority, the input logic threshold voltages of the buffer circuits 3a and 3b may be set oppositely to the way practiced in this embodiment. That is, the input logic threshold voltage $V_{tha}$ of the buffer circuit 3a may be higher than the logic threshold voltage $V_{th}$ of the NAND gate 2a, and the input logic threshold voltage $V_{thb}$ of the buffer circuit 3b may be lower than the logic threshold voltage $V_{th}$ of the NAND gate 2b.

FIG. 4 is a circuit diagram showing one example of an internal configuration of the buffer circuit 3a or 3b. Referring to this figure, this buffer circuit comprises an input terminal T5, an output terminal T6, a voltage source 11 for supplying a voltage $V_{DD}$, ground 12, and a series connection of inverters INV1 and INV2, provided between the input terminal T5 and the output terminal T6. The inverter INV1 is constituted by a series connection of a P channel MOS transistor P1 and an N channel MOS transistor N1, provided between the voltage source 11 and the ground 12. Similarly, the inverter INV2 is constituted by a series connection of a P channel MOS transistor P2 and an N channel MOS transistor N2, provided between the voltage source 11 and the ground 12. An input terminal of the inverter INV1 is connected to the input terminal T5, and an output terminal of the inverter INV2 is connected to the output terminal T6.

A description will be given on a method of setting the input logic threshold voltage of the buffer circuit with the above described circuit configuration. First, an example of a method of setting the input logic threshold voltage to be lower than half the voltage $V_{DD}$ of the voltage source 11, i.e., lower than $\frac{1}{2}V_{DD}$ will be described with reference to FIGS. 5A to 5C. FIG. 5A is a graph of a transmission characteristic of the inverter INV1; FIG. 5B is a graph of that of the inverter INV2; and FIG. 5C is a graph of that of the overall circuit shown in FIG. 4. In general, if the P channel transistor and the N channel transistor constituting the inverter are of the same size, these two transistors have the same threshold voltage, so that the input logic threshold voltage of the inverter constituted by these transistors is half the voltage of the voltage source. However, if these transistors are not equal in size, the input logic threshold voltage of the inverter shifts to a higher voltage or a lower voltage. Thus, with the transistor N1 of the inverter INV1 being larger in size than the transistor P1, the threshold voltage of the transistor N1 becomes higher than that of the transistor P1. A maximum value of an input voltage $V_1$ which respectively turns on and off the transistors N1 and P1 decreases, and thus the input logic threshold voltage of the inverter INV1 shifts to the lower voltage than half the voltage of the supply voltage $V_{DD}$. Therefore, the inverter INV2 achieves the transmission characteristic shown in FIG. 5A. That is, a value of the input voltage attained in case that the output voltage is half the voltage $V_{DD}$ of the voltage source 11, i.e., the input logic threshold voltage $V_T$ becomes lower than $\frac{1}{2}V_{DD}$.

Meanwhile, in case that the transistor P2 is equal in size to the transistor N2, and the input logic threshold voltage of the inverter INV2 is set at $\frac{1}{2}V_{DD}$, the inverter INV2 achieves the transmission characteristic shown in FIG. 5B, in which the ordinate indicates an input voltage $V_2$ of the inverter INV2 and the abscissa indicates an output voltage $V_3$ of the inverter INV2. According to FIGS. 5A and 5B, a relationship between the input voltage $V_1$ and the output voltage $V_3$, i.e., the transmission characteristic of the buffer circuit of FIG. 4 is shown in FIG. 5C. As can be seen in FIGS. 5A-5C, the input logic threshold voltage of the buffer circuit is the input logic threshold voltage $V_T$ of the inverter INV1 ($V_T < \frac{1}{2}V_{DD}$). As described above, with the N channel transistor N1 constituting the inverter INV1 being larger in size than the P channel transistor P1, a buffer circuit with a low input logic threshold voltage is obtained. Similarly, with the P channel transistor P1 constituting the inverter INV1 being larger in size than the N channel transistor N1, a buffer circuit with a high input logic threshold voltage is obtained.

While the NAND gates are employed in the arbiter circuit of this embodiment, NOR gates may be substituted for the elements. In such a case, although a logic level of an acknowledge signal for acknowledgement /negative acknowledgement is opposite to that of the present embodiment, the same effect can be obtained as in the case of the present embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An arbiter circuit comprising:
   first logic means for receiving a first request signal;
   second logic means for receiving a second request signal;
   first buffer means for receiving an output signal from said first logic means; and
   second buffer means for receiving an output signal from said second logic means,
   said first logic means being connected to receive the output signal from said second logic means and an output signal from said second buffer means,
   said second logic means being connected to receive the output signal from said first logic means and an output signal from said first buffer means,
   said first logic means, when receiving said first request signal earlier than when said second logic means receives said second request signal, outputting a first signal of a first logic level indicating acknowledgment of said first request signal as received,
   said second logic means, when receiving said second request signal earlier than when said first logic means receives said first request signal, outputting a second signal of a first logic level indicating acknowledgment of said second request signal as received,
   said second logic means, even if receiving said second request signal while said first signal of said first logic level is being outputted from said first logic means, outputting a signal of a second logic level different from the first logic level indicating negative acknowledgment of said second request signal as received,
   said first logic means, even if receiving said first request signal while said second signal of said first logic level is being outputted from said second logic means, outputting a signal of a second logic level different from the first logic level indicating negative acknowledgement of said first request signal as received, said first and second logic means each outputting a signal of a third level intermediate between the first and second logic levels when simultaneously receiving said first and second request signals, respectively, said first buffer means providing said signal of the first logic level in response to said signal of the third logic level, said second buffer means outputting said signal of the second logic level in response to said signal of the third logic level.

2. An arbiter circuit in accordance with claim 1, wherein
an input logic threshold voltage of said first buffer means is lower than that of said second buffer means.

3. An arbiter circuit in accordance with claim 1 wherein
said first logic means comprises a first NAND gate, and said second logic means comprises a second NAND gate.

4. An arbiter circuit in accordance with claim 3, wherein
the input logic threshold voltage of said first buffer means is lower than a logic threshold voltage of said first logic means, and
the input logic threshold voltage of said second buffer means is higher than a logic threshold voltage of said second logic means.

5. An arbiter circuit in accordance with claim 1, wherein
each of said first and second buffer circuits comprises two inverters connected in series.

6. An arbiter circuit comprising:
a first three-input NAND gate receiving a first request signal with one logic level;
a second three-input NAND gate receiving a second request signal with said one logic level;
a first buffer circuit receiving an output of said first NAND gate and having a first input logic threshold voltage; and
a second buffer circuit receiving an output of said second NAND gate and having a second input logic threshold voltage higher than said first input logic threshold voltage, said first NAND gate being connected to receive the output of said second NAND gate and an output of said second buffer circuit, said second NAND gate being connected to receive the output of said first NAND gate and an output of said first buffer circuit, said first and second NAND gates both having the same logic threshold voltage between said first and second input logic threshold voltages, said first buffer circuit outputting, as a signal indicating acknowledgement of said first request signal, a voltage of a first logic level when the output voltage of said first NAND gate is lower than said first input logic threshold voltage, and outputting, as a signal indicating negative acknowledgement of said first request signal, a voltage of a second logic level when the output voltage of said first NAND gate is higher than said first input logic threshold voltage, said second buffer circuit outputting, as a signal indicating acknowledgement of said second request signal, a voltage of a first logic level when the output voltage of said second NAND gate is lower than said second input logic threshold voltage, and outputting, as a signal indicating negative acknowledgement of said second request signal, a voltage of a second logic level when the output voltage of said second NAND gate is higher than said second input logic threshold voltage, said first and second NAND gates each outputting a voltage equal to said logic threshold voltage when simultaneously receiving said first and second request signals, respectively.

7. An arbiter circuit in accordance with claim 6, wherein
said one logic level is the logically high level;
the first logic level of said signal indicating acknowledgement of said first and second request signals is the logically low level; and
the second logic level of said signal indicating negative acknowledgement of said first and second request signals is the logically high level.

* * * * *